United States Patent
Rogers et al.

(10) Patent No.: US 8,820,856 B2
(45) Date of Patent: Sep. 2, 2014

(54) APPARATUS FOR SETTING PARK BRAKES OF A HEAVY VEHICLE DURING A FAILURE OF A SERVICE BRAKES HOLDING FUNCTION OF THE VEHICLE

(76) Inventors: Matthew E. Rogers, Elyria, OH (US); Travis G. Ramler, Elyria, OH (US); Timothy J. Frashure, Columbia Station, OH (US); David W. Howell, Oak Ridge, NC (US)

(*) Notice: Subject to any disclaimer, the term of this patent is extended or adjusted under 35 U.S.C. 154(b) by 119 days.

(21) Appl. No.: 13/594,170

(22) Filed: Aug. 24, 2012

(65) Prior Publication Data

US 2014/0054118 A1    Feb. 27, 2014

(51) Int. Cl.
*B60T 13/66*    (2006.01)

(52) U.S. Cl.
USPC .................................. 303/15; 303/3

(58) Field of Classification Search
CPC .... B60T 17/22; B60T 17/221; B60T 2270/88
USPC ................... 303/3, 7, 15, 20, 122.09–122.15; 188/112 R
See application file for complete search history.

(56) References Cited

U.S. PATENT DOCUMENTS

| | | |
|---|---|---|
| 3,515,438 A | 6/1970 | Stevenson |
| 3,837,361 A | 9/1974 | Urban |
| 4,121,873 A | 10/1978 | Durling |
| 4,131,324 A | 12/1978 | Kurichh |
| 4,239,293 A | 12/1980 | Page |
| 4,817,502 A | 4/1989 | Seegers |
| 5,286,095 A | 2/1994 | Sell |
| 5,342,119 A | 8/1994 | Smith |
| 5,458,402 A | 10/1995 | Jeffery |
| 7,690,735 B2 | 4/2010 | Bennett |
| 8,583,339 B2 * | 11/2013 | Diekmeyer et al. ............. 701/70 |
| 2008/0309154 A1 * | 12/2008 | Hilberer ......................... 303/15 |
| 2009/0195058 A1 | 8/2009 | Jackson |
| 2009/0280959 A1 * | 11/2009 | Bensch et al. ................ 477/198 |
| 2010/0244550 A1 | 9/2010 | Hilberer |
| 2011/0005874 A1 * | 1/2011 | Beier et al. ................. 188/106 F |
| 2012/0092150 A1 * | 4/2012 | Greene et al. ................ 340/453 |
| 2013/0297163 A1 * | 11/2013 | Kull .............................. 701/70 |

FOREIGN PATENT DOCUMENTS

WO     WO2008122382 A1    10/2008

* cited by examiner

*Primary Examiner* — Christopher Schwartz
(74) *Attorney, Agent, or Firm* — Eugene E. Clair; Cheryl L. Greenly

(57) ABSTRACT

An apparatus is provided for a vehicle having components of a parking brake system and components of a service brake system. The apparatus comprises a normally-energized solenoid operatively coupled to components of the parking brake system and for, when de-energized, exhausting air pressure in at least some components of the parking brake system to set park brakes. The apparatus further comprises an electronic controller arranged to (i) monitor a combination of one or more signals indicative of a service brakes holding function, (ii) monitor a combination of one or more signals indicative of a fault condition, and (iii) provide one or more signals to de-energize the normally-energized solenoid to exhaust air pressure in at least some components of the parking brake system and thereby to set park brakes when both signals indicative of a service brakes holding function and signals indicative of a fault condition of the vehicle are detected.

12 Claims, 2 Drawing Sheets

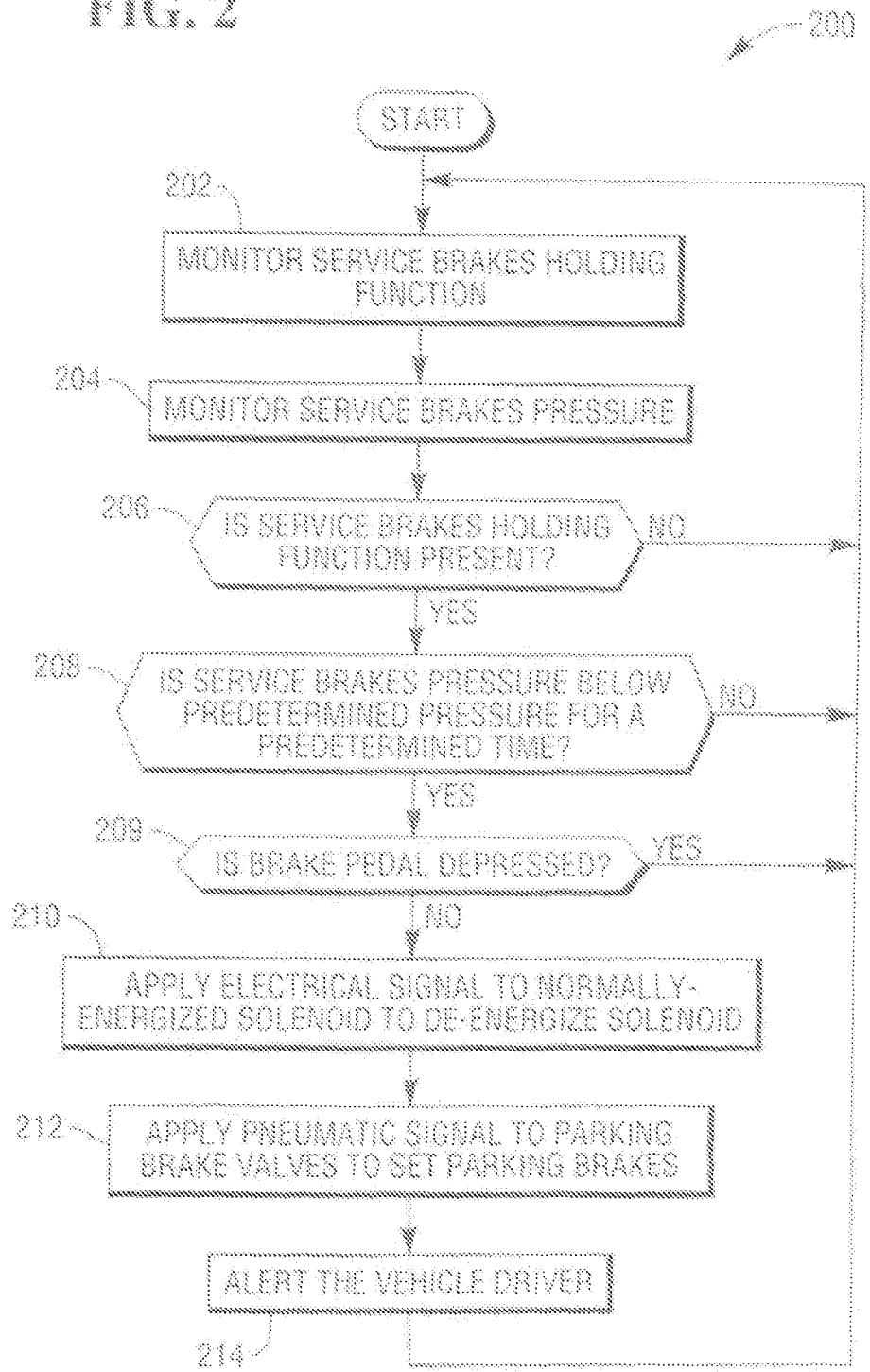

APPARATUS FOR SETTING PARK BRAKES OF A HEAVY VEHICLE DURING A FAILURE OF A SERVICE BRAKES HOLDING FUNCTION OF THE VEHICLE

BACKGROUND

The present application relates to heavy vehicles which have a service brakes holding function, and is particularly directed to an apparatus for setting park brakes of a heavy vehicle, such as a truck, during a failure of a service brakes holding function of the vehicle.

When a truck driver desires to apply park brakes of the truck, the driver typically operates a manually-operable parking switch located in the truck cab. A signal indicative of the driver's intent to apply the park brakes is provided in response to operation of the parking switch. The signal is applied to parking brake valves so as to exhaust air in one or more chambers of spring brake chambers which are operatively coupled to parking brake springs. When air in the spring brake chambers is exhausted to atmosphere and system air pressure drops to less than a predetermined threshold pressure, the parking brake springs are automatically applied without any human intervention to set the park brakes. Operation of the park brakes during a park braking function to park the truck is well known. It would be desirable to set the parking brakes during a vehicle function which is other than a park braking function, such as during a failure of a service brakes holding function, of the truck.

SUMMARY

In accordance with one embodiment, an apparatus is provided for a vehicle having components of a parking brake system and components of a service brake system. The apparatus comprises a normally-energized solenoid operatively coupled to components of the parking brake system and for, when de-energized, exhausting air pressure in at least some components of the parking brake system to set park brakes of the parking brake system. The apparatus further comprises an electronic controller arranged to (i) monitor a combination of one or more signals indicative of a service brakes holding function of the vehicle, (ii) monitor a combination of one or more signals indicative of a fault condition of the vehicle, and (iii) provide one or more signals to be applied to the normally-energized solenoid to de-energize the normally-energized solenoid to exhaust air pressure in at least some components of the parking brake system and thereby to set park brakes of the parking brake system when both the combination of one or more signals indicative of a service brakes holding function and the combination of one or more signals indicative of a fault condition of the vehicle are detected.

BRIEF DESCRIPTION OF THE DRAWING

FIG. 2 is a flow diagram depicting a method of operation of an apparatus in accordance with an embodiment.

DETAILED DESCRIPTION

Figure 1:
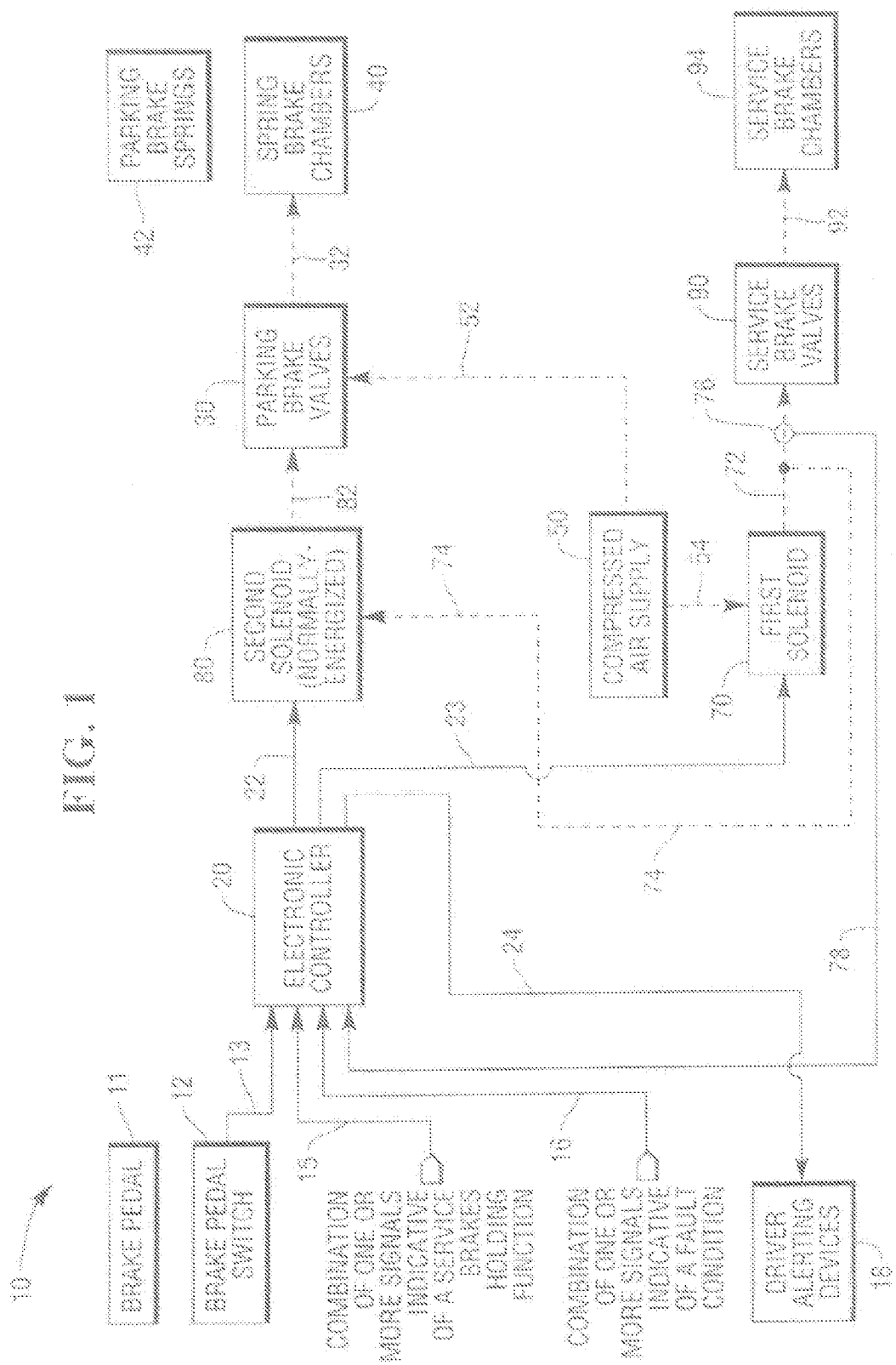
FIG. 1 is a schematic block diagram showing an apparatus constructed in accordance with an embodiment.

Referring to FIG. 1, apparatus 10 is provided for use in a heavy vehicle such as a truck. Apparatus 10 is constructed in accordance with one embodiment. In FIG. 1, electrical line connections are shown as solid lines, and pneumatic lines connections are shown as dashed lines.

Brake pedal 11 can be depressed by the vehicle driver to apply service brakes of the vehicle. When brake pedal 11 is depressed by the vehicle driver, brake pedal switch 12 provides one or more signals on line 13 indicative of the vehicle driver's intent to apply service brakes of the vehicle. Structure and operation of brake pedal 11 and brake pedal switch 12 to provide signals on line 13 are known and, therefore, will not be described.

Electronic controller 20 monitors signals on line 13 from brake pedal switch 12 indicative of the vehicle driver's intent to apply service brakes of the vehicle. Controller 20 monitors a combination of one or more signals on line 15 indicative of a service brakes holding function of the vehicle. Signals on line 15 are from one or more vehicle sensors (not shown). An example of a service brakes holding function of the vehicle is a hill-start-assist function in which service brakes are applied to prevent the vehicle from rolling backwards when the vehicle is starting from a halted position on an inclined surface such as on a hill.

Controller 20 provides one or more signals on line 23 to control operation of first solenoid 70 in response to signals on line 13 indicative of the vehicle driver's intent to apply service brakes of the vehicle and signals on line 15 indicative of a service brakes holding function. Compressed air supply 50 provides a source of compressed air in line 54 to first solenoid 70. First solenoid 70 is controlled by signals on line 23 from controller 20 to control pneumatic pressure in line 72 to one or more service brake valves 90. In response to pneumatic pressure in line 72 from first solenoid 70, service brake valves 90 are controlled to control pneumatic pressure in line 92 to one or more chambers of service brake chambers 94 and thereby to apply service brakes of the vehicle during the service brakes holding function.

The number of service brake chambers 94 depends on the number of axles of the particular vehicle. Accordingly, the number of service brake valves 90, the number of service brake chambers 94, and the number of pneumatic lines depends on the number of axles of the particular vehicle. First solenoid 70, service brake valves 90, and service brake chambers 94 comprise part of a conventional service brake system which can provide a service brakes holding function. Structure and operation of first solenoid 70 and service brake valves 90 for controlling operation of service brake chambers 94 to apply service brakes of the vehicle during a service brakes holding function are known and, therefore, will not be described.

Compressed air supply 50 provides a source of compressed air in line 52 to parking brake valves 30. Parking brake valves 30 are controlled (which may be by controller 20) to vary pneumatic pressure in line 32 to one or more chambers of spring brake chambers 40. When the vehicle driver desires to apply park brakes of the vehicle, the driver operates a parking switch (not shown) which provides a signal indicative of the driver's intent to apply park brakes of the vehicle. This signal is applied to parking brake valves 30.

In response to the signal being applied to parking brake valves 30, air is exhausted in one or more chambers of spring brake chambers 40 which are operatively coupled in known manner to parking brake springs 42. When air in spring brake chambers 40 is exhausted and system air pressure drops to less than about 45 psi to 60 psi, parking brake springs 42 are automatically applied without any human intervention to apply park brakes, as is known. Structure and operation of parking brake valves 30 for controlling operation of spring brake chambers 40 and parking brake springs 42 to park the vehicle are conventional and, therefore, will not be further described. Spring brake chambers 40 and service brake chambers 94 may comprise an all-in-one brake actuator. As an example, the brake actuator may comprise EverSure™ spring brake available from Bendix Spicer Foundation Brake LLC located Elyra, Ohio.

Controller 20 monitors a combination of one or more signals on line 16 indicative of a fault condition of the vehicle. Signals on line 16 are from one or more vehicle sensors (not shown). Controller 20 provides one or more signals on line 24 to one or more driver alerting devices 18. Driver alerting devices 18 may include any combination of audible, visual, and haptic devices, for examples.

In accordance with one embodiment, second solenoid 80 is pneumatically connected between line 74 and line 82. Second solenoid 80 is normally-energized, and is operatively coupled to parking brake valves 30. Line 74 is plumbed off of line 72 which is pneumatically connected between first solenoid 70 and service brake valves 90. Line 82 is pneumatically connected between second solenoid 80 and parking brake valves 30. When second solenoid 80 is energized, line 74 and line 82 are not in fluid communication with each other. When second solenoid 80 is de-energized, line 74 and line 82 are in fluid communication with each other.

Pressure sensor 76 is also plumbed off of line 72. Pressure sensor 76 provides one or more electrical signals on line 78 which is indicative of service brakes pressure in line 72. In response to signals on line 15, signals on line 16, and signals on line 78, controller 20 provides one or more electrical signals on line 22 to control de-energization of solenoid 60 and thereby to set the park brakes in accordance with a method to be described hereinbelow.

Referring to FIG. 2, flow diagram 200 depicts a method of operation of apparatus 10 of FIG. 1 in accordance with an embodiment. Program instructions for enabling controller 20 shown in FIG. 1 to perform operation steps in accordance with flow diagram 200 shown in FIG. 2 may be embedded in memory internal to controller 20. Alternatively, or in addition to, program instructions may be stored in memory external to controller 20. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

In step 202, controller 20 monitors signals on line 15 indicative of a service brakes holding function of the vehicle. In step 204, controller 20 monitors signals on line 78 from pressure sensor 76 indicative of service brakes pressure. A determination is made in step 206 as to whether signals on line 15 are indicative of a service brakes holding function being present and active. If determination in step 206 is negative (i.e., there is no indication of a service brakes holding function being present and active), the process returns to steps 202 and 204 to continue monitoring signals on line 78 from pressure sensor 76 and signals on line 15 from other sensors. However, if determination in step 206 is affirmative (i.e., there is an indication of a service brakes holding function being present and active), the process proceeds to step 208.

In step 208, a determination is made as to whether service brakes pressure as indicated on line 78 is below a predetermined amount of pressure for at least a predetermined amount of time. If determination in step 208 is negative (i.e., service brakes pressure is not below the predetermined amount of pressure for at least the predetermined amount of time), the process returns back to steps 202 and 204 to continue monitoring signals on line 78 from pressure sensor 76 and signals on line 15 from other sensors. However, if determination in step 208 is affirmative (i.e. service brakes pressure is below the predetermined amount of pressure for at least the predetermined amount of time), the process proceeds to step 209.

In step 209, a determination is made as to whether brake pedal 11 is depressed as indicated by signal on line 13 from brake pedal switch 12. If determination in step 209 is affirmative (i.e., brake pedal 11 is depressed), the process returns back to steps 202 and 204 to continue monitoring signals on line 78 from pressure sensor 76 and signals on line 15 from other sensors. However, if determination in step 209 is negative (i.e., brake pedal 11 is not depressed), the process proceeds to step 210.

In step 210, controller 20 applies electrical signal on line 22 to de-energize normally-energized second solenoid 80. When second solenoid 80 is de-energized, line 74 is connected in fluid communication with line 82 to provide one or more pneumatic signals in line 82. In step 212, pneumatic signal in line 82 is applied to parking brake valves 30 to set park brakes of the vehicle.

More specifically, in response to pneumatic signal in line 82, parking brake valves 30 rapidly exhaust system air pressure to atmosphere. By rapidly exhausting system air pressure in parking brake valves 30, air in spring brake chambers 40 is rapidly depleted. When air in spring brake chambers 40 is depleted to less than about 45 psi to 60 psi, parking brake springs 42 are automatically applied to set the park brakes of the vehicle without any driver intervention. Accordingly, parking brake valves 30 are controlled to set the park brakes when service brakes pressure in line 72 (and therefore in line 74) drops below the predetermined amount of pressure for at least the predetermined amount of time while the vehicle is in a service brakes holding function. Thus, park brakes of the vehicle are triggered to set upon occurrence of a vehicle fault condition during a service brakes holding function.

Although the above description describes a vehicle fault condition as being service brakes pressure as indicated on line 78 dropping below the predetermined amount of pressure for at least the predetermined amount of time, it is conceivable that other fault conditions are possible. As mentioned hereinabove, controller 20 monitors the combination of one or more signals on line 16 indicative of a vehicle fault condition. The combination of one or more signals on line 16 may comprise one or more signals which are indicative of service brakes pressure at a different location in the service brakes system. This different location in the service brake system may be in line 92 which interconnects service brake valves 90 and service brake chambers 94 as shown in FIG. 1.

As a more general example, a vehicle fault condition may be defined as when pressure is lost any time that service brakes of the vehicle should be applied. Pressure loss may occur when a power loss occurs, for example. These are only examples of vehicle fault conditions, and other vehicle fault conditions are possible.

In step 214, controller 20 provides one or more signals on line 24 to operate driver alerting devices 18. The driver is thereby alerted of the fault condition occurring while the vehicle is in a service brakes holding function.

It should be apparent that second solenoid 80 remains energized when the vehicle is operating correctly (i.e., no vehicle fault condition has occurred), but de-energizes to set the park brakes upon occurrence of a vehicle fault condition during a service brakes holding function. In the example embodiment described hereinabove, second solenoid 80 de-energizes when pressure sensor 76 indicates that service brakes are not being applied when they should be (such as during a hill-start-assist function).

It should also be apparent that the above-described operation of the park brake system provides an automated way of setting park brakes of the vehicle in response to detecting a vehicle fault condition while the vehicle is in a service brakes holding function. The park brakes are set automatically in that they are set without any further intervention by the vehicle driver after the vehicle fault condition has been detected. This automatic feature is helpful when a vehicle fault condition occurs and the vehicle driver is not physically applying the service brakes.

Although FIG. 2 shows presence of step 209, it is conceivable that an embodiment may omit step 209.

Although the above description describes second solenoid 80 as being normally-energized, it is conceivable that second solenoid 80 be de-energized whenever first solenoid 70 is not energized. This is to extend the durability/life of second solenoid 80.

Although the above description describes a service brakes holding function as being a hill-start-assist function, it is conceivable that the service brakes holding function be other than a hill-start-assist function. As an example, the service brakes holding function may be a work braking function for a vehicle. The work braking function provides a temporary service brakes holding function, such as provided in garbage/waste collection trucks. Structure and operation of components for performing the work brake function is known and, therefore, will not be described. These are only examples of service brakes holding functions, and other service brakes holding functions are possible.

Also, although the above description describes pneumatic line 74 being plumbed between second solenoid 80 and pneumatic line 72, it is conceivable that other embodiments are possible. For example, it is conceivable that pneumatic line 74 be plumbed instead between second solenoid 80 and a different location. For example, pneumatic line 74 may be plumbed between second solenoid 80 and compressed air supply 50. Pneumatic connection between second solenoid 80 and other locations are possible.

Further, although the above description describes use of one electronic controller, it is conceivable that any number of electronic controllers may be used. Moreover, it is conceivable that any type of electronic controller may be used. Suitable electronic controllers for use in vehicles are known and, therefore, have not been described.

Although the above description describes second solenoid 80 being controlled to exhaust air pressure in parking brake valves 30 to atmosphere, it is conceivable that more than one electropneumatic valve may be used in place of second solenoid 80 and controlled to exhaust air pressure in parking brake valves 30 to atmosphere.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An apparatus for a vehicle having components of a parking brake system and components of a service brake system, the apparatus comprising:

a normally-energized solenoid operatively coupled to components of the parking brake system and for, when de-energized, exhausting air pressure in at least some components of the parking brake system to set park brakes of the parking brake system; and an electronic controller arranged to (i) monitor a combination of one or more signals indicative of a service brakes holding function of the vehicle, (ii) monitor a combination of one or more signals indicative of a fault condition of the vehicle, and (iii) provide one or more signals to be applied to the normally-energized solenoid to de-energize the normally-energized solenoid to exhaust air pressure in at least some components of the parking brake system and thereby to set park brakes of the parking brake system when both the combination of one or more signals indicative of a service brakes holding function and the combination of one or more signals indicative of a fault condition of the vehicle are detected.

2. An apparatus according to claim 1, further comprising a pressure sensor arranged to sense pressure in a least one component of the service brake system, and to provide a signal which comprises the combination of one or more signals indicative of a fault condition of the vehicle.

3. An apparatus according to claim 2, wherein the pressure sensor is plumbed to a pneumatic line which interconnects service brake valves and a solenoid operatively coupled to components of the service brake system.

4. An apparatus according to claim 3, wherein the electronic controller arranged to provide one or more signals to be applied to the normally-energized solenoid to de-energize the normally-energized solenoid includes the electronic controller arranged to provide the one or more signals to de-energize the normally-energized solenoid to exhaust air pressure in components of the parking brake system to atmosphere when the signal from the pressure sensor is indicative of pressure in the pneumatic line dropping below a predetermined amount of pressure for at least a predetermined amount of time.

5. An apparatus according to claim 4, wherein the electronic controller arranged to provide the one or more signals to de-energize the normally-energized solenoid to exhaust air pressure in components of the parking brake system to atmosphere includes the electronic controller arranged to provide the one or more signals to de-energize the normally-energized solenoid to exhaust air pressure in parking brake valves and spring brake chambers of the parking brake system to atmosphere so that parking brake springs of the parking brake system are applied while both the service brakes holding function and the fault condition of the vehicle are detected.

6. An apparatus according to claim 1, wherein the electronic controller is further arranged to provide a signal to be applied to one or more driver alerting devices when both the combination of one or more signals indicative of a service brakes holding function and the combination of one or more signals indicative of a fault condition of the vehicle are detected.

7. A program storage medium readable by a computer having a memory, the medium tangibly embodying one or more programs of instructions executable by the computer to perform method steps for processing signals of a vehicle having components of a parking brake system and components of service brake system, the method comprising the steps of:

receiving a first signal indicative of a service brakes holding function of the vehicle being active;

receiving a second signal indicative of a fault condition of the vehicle;

providing a third signal to be applied to de-energize a normally-energized solenoid in response to receiving the first and second signals; and providing a fourth signal to be applied to components of the parking brake system to set park brakes of the parking brake system in response to the third signal being applied to the normally-energized solenoid to de-energize the solenoid.

8. A program storage medium according to claim 7, wherein receiving a second signal indicative of a fault condition of the vehicle includes receiving the second signal in response to service brakes pressure of the service brake system dropping below a predetermined amount of pressure.

9. A program storage medium according to claim 8, wherein receiving the second signal in response to service brakes pressure of the service brake system dropping below a predetermined amount of pressure includes receiving the second signal in response to service brakes pressure of the service brake system dropping below the predetermined amount of pressure for at least a predetermined amount of time.

10. A program storage medium according to claim 7, wherein providing a fourth signal to be applied to components of the parking brake system includes providing the fourth signal to be applied to components of the parking brake system to exhaust air pressure in parking brake valves and spring brake chambers of the parking brake system to atmosphere so that parking brake springs of the parking brake system are applied to set the park brakes of the parking brake system.

11. A program storage medium according to claim 7, wherein receiving a first signal indicative of a service brakes holding function of the vehicle being active includes receiving the first signal when a vehicle driver is not pressing on a brake pedal of the vehicle.

12. A program storage medium according to claim 7, wherein the method further includes the step of:

providing a fifth signal to be applied to a driver alerting device in response to the third signal being applied to de-energize the normally-energized solenoid.

* * * * *